United States Patent [19]
Hyodo et al.

[11] Patent Number: 5,926,562
[45] Date of Patent: Jul. 20, 1999

[54] IMAGE PROCESSING METHOD USING REFERENCE VALUES TO DETERMINE EXPOSURE STATE

[75] Inventors: Manabu Hyodo; Hiroshi Tanaka, both of Asaka, Japan

[73] Assignee: Fuji Photo Film Co., Ltd., Kanagawa, Japan

[21] Appl. No.: 08/666,122

[22] Filed: Jun. 21, 1996

[30] Foreign Application Priority Data

Jun. 23, 1995 [JP] Japan ................................ 7-158004
Jun. 23, 1995 [JP] Japan ................................ 7-158005
Jun. 23, 1995 [JP] Japan ................................ 7-158006

[51] Int. Cl.$^6$ .................................................. G06T 5/40
[52] U.S. Cl. .......................... 382/167; 382/168; 382/274; 358/516; 358/519; 348/96; 348/223; 348/254; 348/655; 348/658
[58] Field of Search .................................... 382/167, 168, 382/274; 358/518, 519, 521, 522, 504, 516, 527; 348/96, 97, 254, 223, 655, 658

[56] References Cited

U.S. PATENT DOCUMENTS

| | | | |
|---|---|---|---|
| 4,239,384 | 12/1980 | Treiber | 355/68 |
| 4,527,881 | 7/1985 | Sugawara | 396/234 |
| 4,667,250 | 5/1987 | Murai | 358/456 |
| 4,689,691 | 8/1987 | Isogai et al. | 358/461 |
| 4,866,513 | 9/1989 | Takahashi | 358/506 |
| 5,023,656 | 6/1991 | Terashita | 355/41 |
| 5,036,400 | 7/1991 | Haruki | 348/364 |
| 5,194,945 | 3/1993 | Kadowaki | 358/520 |
| 5,210,600 | 5/1993 | Hirata | 358/527 |
| 5,414,538 | 5/1995 | Eschbach | 358/522 |
| 5,463,702 | 10/1995 | Trueblood | 382/239 |
| 5,475,493 | 12/1995 | Yamana | 356/404 |
| 5,512,948 | 4/1996 | Iwamatsu | 348/255 |
| 5,517,335 | 5/1996 | Shu | 358/518 |
| 5,542,003 | 7/1996 | Wofford | 382/132 |
| 5,574,764 | 11/1996 | Granfors | 378/98.7 |
| 5,640,201 | 6/1997 | Inuiya | 348/98 |

FOREIGN PATENT DOCUMENTS

| | | |
|---|---|---|
| 4-107083 | 4/1992 | Japan . |
| 6-274946 | 9/1994 | Japan . |

*Primary Examiner*—Kim Yen Vu
*Assistant Examiner*—David Rosenblum

[57] ABSTRACT

A film image, which is taken into the developed photographic film, is picked up, and a reference maximum value and a reference minimum value of an image signal are determined by the image signal which is obtained when the image is picked up. The reference maximum value and the reference minimum value are used in the signal processing for adjusting the tone of the image, etc. Moreover, the exposure state of the film image is determined based on at least one of the reference maximum value, the reference minimum value, and the average value. If the exposure state is determined to be underexposured, the gamma in the gamma correction is smaller than the gamma during the standard exposure, so that the middle tone can be prevented from being dark. On the other hand, if the exposure state is determined to be overexposured, the gamma in the gamma correction is larger than the gamma during the standard exposure, so that the middle tone can be prevented from being too bright. If the color image is a color failure scene, at least one of the reference maximum value and the reference minimum value is corrected so as to realize the satisfactory color reproduction.

12 Claims, 12 Drawing Sheets

IMAGE PROCESSING METHOD USING REFERENCE VALUES TO DETERMINE EXPOSURE STATE

BACKGROUND OF THE INVENTION

1. Field of the Invention

The present invention relates to an image processing method, and more particularly to an image processing method for determining an exposure state of a film image, such as underexposure, overexposure, etc., so as to process the image based on the exposure state.

2. Description of the Related Art

FIG. 11 is a graph showing the characteristics curve of negative film. A, B, and C indicate an exposure area of standard exposure, underexposure, and overexposure, respectively. As shown in the drawing, the negative image, which is underexposed or overexposed in photographing, is different from a standardly-exposed negative image in their gradation characteristics and gamma characteristics. Japanese Patent Application Laid open 4-107083 discloses a signal processing circuit, which uses a variable gamma so as to deal with image signals of various gradation characteristics. The signal processing circuit is an analog processing circuit, and has a variable gain amplifier circuit in a front step and a back step in a gamma correction circuit having a knee characteristics. The gain of these variable gain amplifier circuits is adjusted so as to change the gamma.

A density area of the overexposed and underexposed negative images is narrower than that of the standardly exposed image. Japanese Patent Application Laid-open No. 6-274946 discloses an image processing method which adjusts the tone of the soft-tone image and the hard-tone image.

When the gamma correction, etc. of the image signal is performed without logarithmic conversion, the underexposed or overexposed negative image is different from the standardly-exposed negative image in its gamma characteristics. Therefore, the gamma correction should be performed depending on the exposure state. If the overexposed or underexposed negative image is gamma-corrected in the same way as the standardly-exposed negative image, the underexposed image is dark and the overexposed image is too bright and the tone is not favorable.

Moreover, if the tone of the underexposed or overexposed image is adjusted in the same way as the standardly-exposed negative image when the tone of the soft-tone image and the hard-tone image is adjusted, there is a problem in that the tone changes too much and therefore the image is unnatural.

On the other hand, there is an image processing method for adjusting a white balance and a black balance of the R, G and B image signals which are obtained by picking up a color image. In this image processing method, a reference maximum value and the reference minimum value are determined from the R, G and B image signals. An offset and a white balance gain are determined so that the reference maximum value and the reference minimum value are predetermined gradations. The offset and the gain control of the R, G and B image signals are performed by the offset and the white balance gain. A histogram is obtained with regard to each gradation of the image signal, so that the reference maximum value and the reference minimum value can be determined from the histogram.

In the color image which has an extremely-high chroma area, the reference maximum value and the reference minimum value tend to be uneven. For example, as shown in FIG. 12, the reference minimum value of B is sometimes much larger than the reference minimum value of the other color.

In the above-mentioned case, if the offset and the gain control of the R, G and B image signals are performed using the reference maximum value and the reference minimum value obtained from the R, G and B image signals, there is a problem in that the white balance and the black balance are lost and the color is not reproduced satisfactorily.

That is, in the scene as shown in FIG. 12, the white balance gain of the B image signal is much stronger than that of the other color signals, so there is a problem in that the whole scene is blue (color failure).

SUMMARY OF THE INVENTION

It is an object of the present invention to provide an image processing method which makes it possible to easily and accurately determine an exposure state such as underexposure, overexposure, etc. of the film image.

It is another object of the present invention to provide an image processing method which makes it possible to reproduce a tone satisfactorily even if the exposure state of the film image is uneven.

It is also another object of the present invention to provide an image processing method which makes it possible to reproduce color satisfactorily even if there is an area of extremely high brightness, and if reference maximum values and reference minimum values of different colors in a color image are uneven to a large extent.

In order to achieve the above-mentioned objects, an image processing method comprises the steps of picking up a film image taken in developed photographic film obtaining a reference maximum value and a reference minimum value or a reference maximum value, a reference minimum value and an average value of the image signal from an image signal obtained by the image pickup, and determining an exposure state of the film image based on at least one of the reference maximum value, the reference minimum value, and the average value for processing the image based on the reference maximum value, the reference minimum value and the determination results. For example, the exposure state of the negative film is determined based on the reference maximum value. When the reference maximum value is less than the reference value for determining an overexposure, the exposure state is determined to be overexposed. When the reference maximum value is more than the reference value for determining an underexposure, the exposure state is determined to be underexposed.

Incidentally, the reference maximum value and the reference minimum value used for the determination are originally used for the image processing. They do not have to be detected for determining the exposure state; therefore, the exposure state can be easily determined. A value having high accuracy in the determination of the exposure state is selected appropriately in accordance with the exposure state of the film image from the determined reference maximum value, the reference minimum value and the average value. The exposure state of the film image is determined based on the selected value. For example, if the determined reference maximum value is more than a predetermined threshold level wherein the accuracy in the determination of the exposure state based on the reference maximum value lowers, the exposure state of the film image is determined based on the average value instead of the reference maximum value. As a result, the exposure state can be determined accurately.

Moreover, in the present invention, the image processing method comprises the steps of obtaining a reference maximum value and a reference minimum value from an image signal gained when a film image is picked up, correcting the image signal so that the reference maximum value and the reference minimum value are a predetermined gradation, and performing a gamma correction; determining the exposure state of the film image, making a gamma in the gamma correction smaller compared to a standard exposure when the exposure state is determined to be underexposed based on the result of the determination as to the exposure state so that a middle tone is prevented from being dark, and making the gamma in the gamma correction larger compared to the standard exposure when the exposure state is determined to be overexposed so that the middle tone is prevented from being to bright.

Furthermore, the present invention comprises the steps of: obtaining a reference maximum value and a reference minimum value from an image signal when the film image picked up; correcting at least one of the reference maximum value and the reference minimum value so that a ratio or difference between the reference maximum value and the reference minimum value is in a range from the first threshold level to the second threshold level, which are set previously to obtain a predetermined tone; correcting the image signal so that the corrected reference maximum value and the reference minimum value are a predetermined gradation; and adjusting a hard tone image and a soft tone image so that they are in a predetermined tone. In this case, the first threshold level and the second threshold level when at least one of the reference maximum value and the reference minimum value is corrected are changed according to the exposure state of the film image. That is, when the exposure state is determined to be underexposed or overexposed, the first threshold level and the second threshold level are changed to the third threshold level and the fourth threshold level, which are lower than the first threshold level and the fourth threshold level, respectively. As a result, the tone of the underexposed or overexposed film does not change unnaturally, so the tone can be reproduced satisfactorily.

Furthermore, in the present invention, a color image is picked up to gain image signals of each color; a reference maximum value and a reference minimum value of the image signals of each color, which are gained by the image pickup; and the image signal is corrected so that the reference maximum value and the reference minimum value are a predetermined gradation. As a result, the color can be reproduced satisfactorily even if the reference maximum values and the reference minimum values of different colors are greatly uneven in the color image. That is, the ratio or difference between the reference maximum values of different colors is obtained, and it is determined whether or not the ratio or difference is in a predetermined range wherein a predetermined white balance adjustment is possible. If the ratio or difference exceeds the predetermined range, the reference maximum values and/or the reference minimum values of different colors are corrected so that the reference maximum values and/or the reference minimum values are close to each other. As a result, the unevenness in the reference maximum values and the reference minimum values is decreased, so that the color can be reproduced satisfactorily. The above-described determination can also be performed using the reference minimum value instead of the reference maximum value.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 10 is a graph showing the determination of a color failure scene, and the like;

DETAILED DESCRIPTION OF THE PREFERRED EMBODIMENTS

Figure 1:
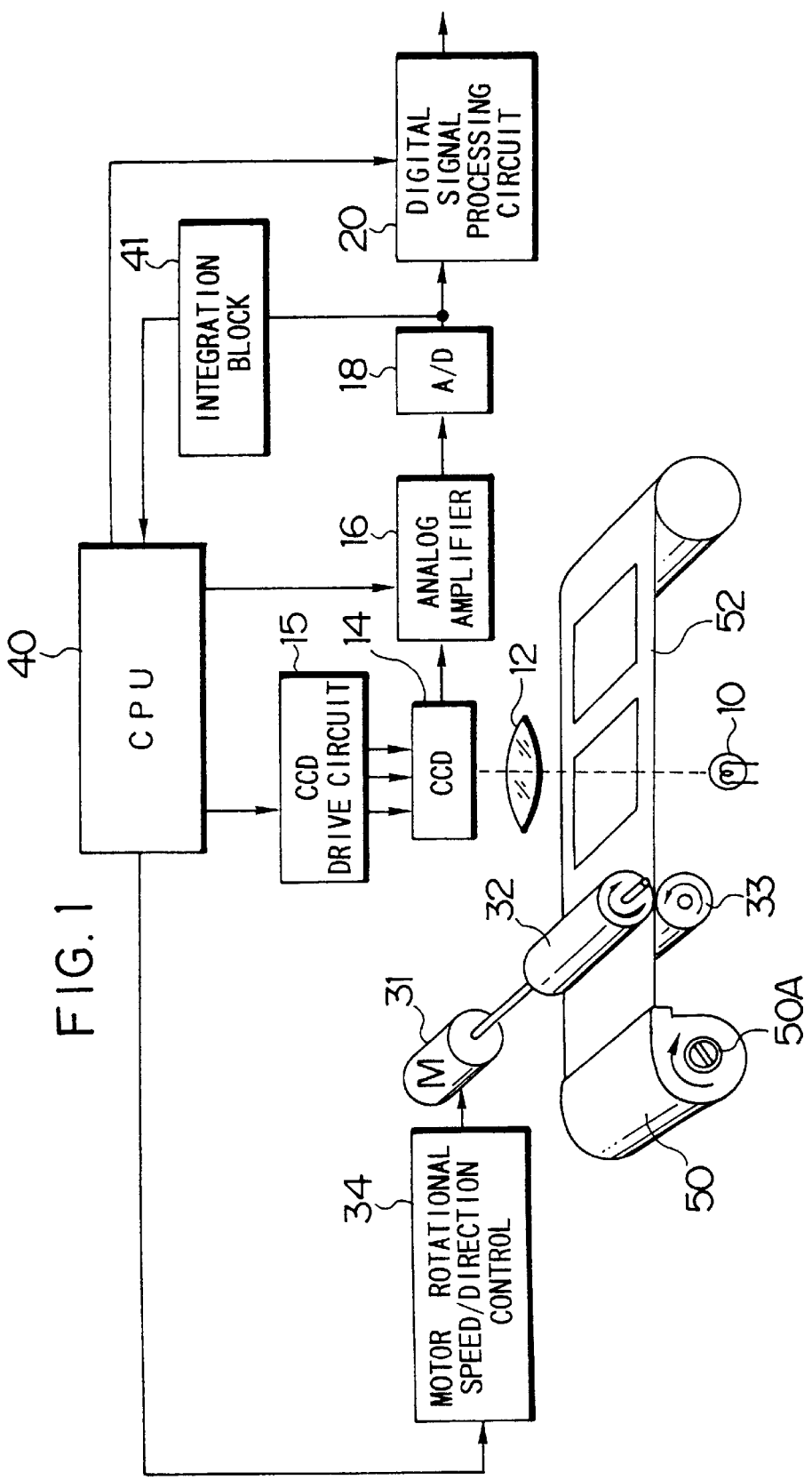
FIG. 1 is a block diagram showing one embodiment of a film scanner to which the present invention is applied.

FIG. 1 is a block diagram illustrating one embodiment for a film scanner to which the present invention is applied. The film scanner includes a light source 10 for illumination, a taking lens 12, a CCD line sensor 14, an analog amplifier 16, an A/D converter 18, a digital signal processing circuit 20, a motor 31, a film drive apparatus including a capstan 32 and a pinch roller 33, a central processing unit (CPU) 40, an integration block 41, and the like.

The light source 10 illuminates developed negative film 52, which is pulled out from the film cartridge 50, through an infrared cutting filter (not shown). The light, which has been transmitted through the film 52, is formed on a light accepting surface of the CCD line sensor 14.

In the CCD line sensor 14, the light accepting part for 1024 pixels is arranged in a direction perpendicular to a film feed direction. The image light, which is formed on the light accepting surface of the CCD line sensor 14, is electrically charged in each light accepting part, which is provided with R, G and B filters. Then, the image light is converted into signal electric charge of R, G and B according to the light strength. When the lead gate pulse of one line cycle is added to the electric charge of R, G and B, which are accumulated as described above, by the CCD drive circuit 15, they are transferred to a shift register. Then, they are sequentially transmitted as voltage signals by a register transfer pulse. In the CCD line sensor 14, a shutter gate and a shutter drain are provided close to each light accepting part. The shutter gate is driven by a shutter gate pulse, so that the electric charge accumulated in the light accepting part can be expelled to the shutter drain. That is, the CCD line sensor 14 has a so-called electronic shutter function of controlling the electric charge accumulated in the light-accepting part in accordance with the shutter gate pulse, which is applied by the CCD drive circuit 15.

The R, G and B voltage signals from the CCD line sensor 14 are clamped by a CDS clamp (not shown), and are applied to the analog amplifier 16. The gain is controlled there as described later. The R, G and B voltage signals of one frame from the analog amplifier 16 are converted into dot-sequential R, G and B digital image signals by the A/D converter 18. A white balance, a black balance, a negative-positive inversion, a gamma correction, etc. are performed for the signals, which are stored in an image memory (not shown).

The image signals of one frame, which are stored in the image memory, are read out repeatedly. They are converted into analog signals by the D/A converter, and are converted into a NTSC complex video signals, which are output to a monitor TV by an encoder. Thus, the film image can be watched on the monitor TV.

The film drive apparatus is composed of a film supply part, which is engaged with a spool 50A of the film cartridge 50 and drives the spool 50A in the forward and backward directions, a film windup part for winding up the film 52 from the film supply part, a device arranged on a film transport path for transporting the film 52 at a desired speed between the capstan 32 and the pinch roller 33 which are driven by the motor 31. Incidentally, the film supply part drives the spool 50 of the film cartridge 50 in a clockwise direction in FIG. 1. The film supply part sends out the film 52 from the film cartridge 50 until a tip of the film is wound up by the film windup part. The CPU 40 controls the forward/backward rotation and start/stop of the motor 31, and also controls the film transport speed by a pulse width via a motor rotational speed/orientation direction control circuit 34.

Figure 2:
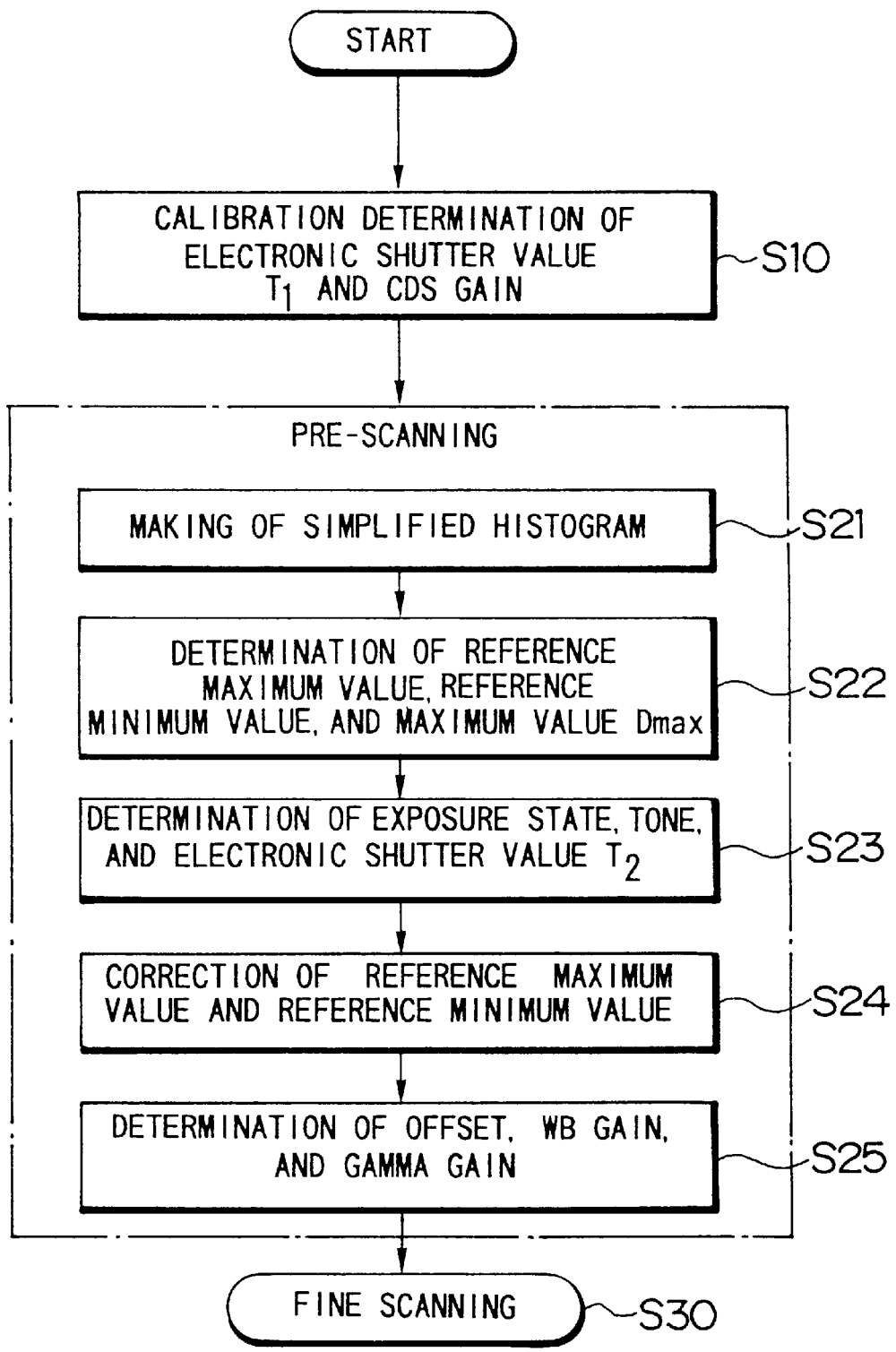
FIG. 2 is a flow chart showing processing of an image in the film scanner of FIG. 1.

Next, an explanation will be given of a procedure for processing the image with reference to the flow chart in FIG. 2.

First, the film cartridge 50 is set in a cartridge storage part (not shown). If the film 52 is sent from the film cartridge 50, and then the tip of the film is wound around a windup reel of the film windup part (if the film loading is completed), the following calibration is executed (step S10).

That is, an electronic shutter value $T_1$ of the CCD line sensor 14 is set to a prescribed value (40% for example), and a non-exposure area of the film 52 (a negative base at the tip of the film, for example) is picked up. The gain of the analog amplifier 16 is determined so that each of R, G and B signals can be a predetermined maximum value (that is, an input range of the A/D converter 18 is at the maximum).

After the gain of the analog amplifier 16 is adjusted as mentioned above, the film 52 is transported at a constant speed, and the film image is scanned (pre-scanning) (step S20). In the process of pre-scanning, the dot-sequential R, G and B digital image signals are taken into the integrating block 41 via the CCD line sensor 14, the analog amplifier 16 and the A/D converter 18.

The integration block 41 integrates a gradation (an 8-bit gradation in this embodiment) of the digital image signal in a predetermined integration area for R, G and B digital image signals, so that the average gradation in the integration area can be determined. The integration block 41 makes each gradation data of an integration area, wherein there are 5,000 to 10,000 points in one screen. Moreover, the integration block 41 counts a frequency of each gradation based on the sequentially made gradation data. The integration block 41 stops counting when the frequency exceeds a threshold level TH (1% of the total points in this embodiment) which is set with regard to the total points of the gradation data.

Figure 3:
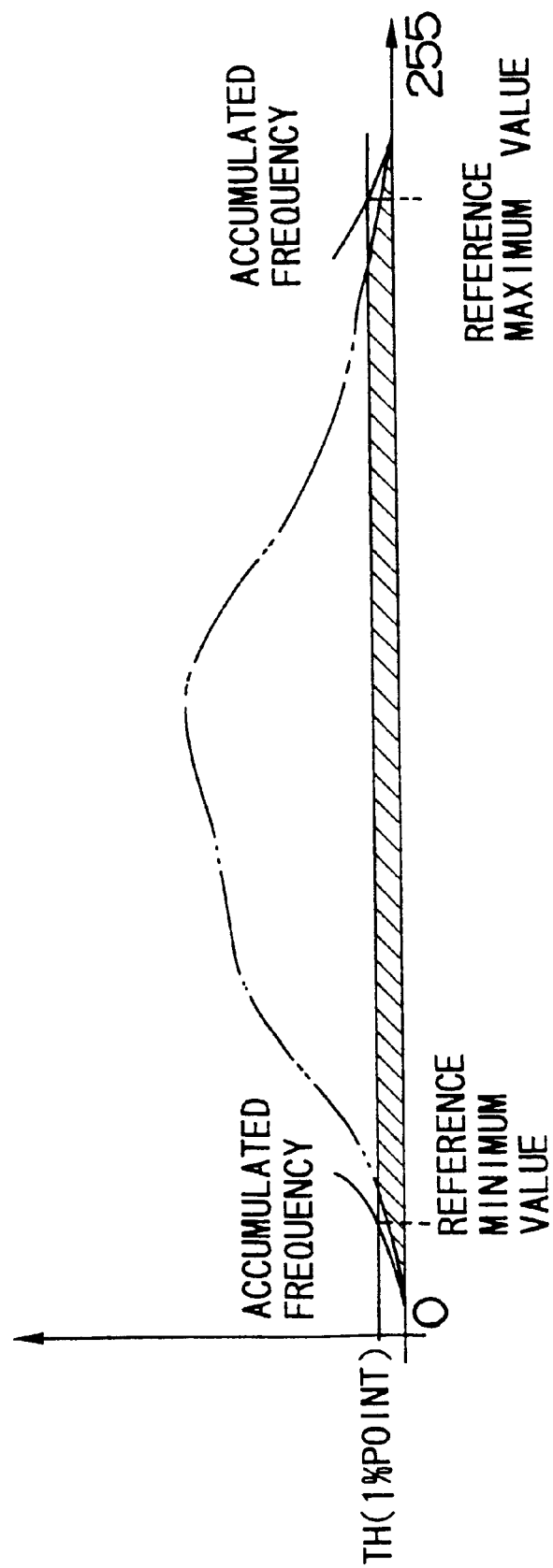
FIG. 3 is a histogram showing how to determine a reference maximum value and a reference minimum value.

That is, as shown in FIG. 3, the integrating block 41 produces a simplified histogram (a histogram indicated by slanted lines in FIG. 3) wherein the frequency is counted to the threshold lever TH for all gradations from 0 to 255 as shown in FIG. 3. Incidentally, because the frequency exceeding the threshold level TH is not counted, the number of bits in the counter can be substantially reduced. The original histogram in the case when the total points are counted is indicated The CPU 40 accumulates the frequency from the smaller gradation in the simplified histogram in FIG. 3. The gradation, wherein the accumulated frequency reaches or exceeds the threshold level TH for the first time, is the reference minimum value, which is determined for each of R, G and B. The integration block 41 also accumulates the frequency from the larger gradation. The gradation, wherein the accumulated reaches or exceeds the threshold level for the first time, is a reference maximum value, which is determined for each of R, G and B. Furthermore, the maximum value $D_{max}$ in R, G and B is obtained from the simplified histogram (step S22).

Next, the exposure state such as underexposure, overexposure, etc., and the tone such as soft tone, hard tone, etc., of the film image are determined based on the reference maximum value and the reference minimum value, which are obtained in the above-mentioned manner. An electronic shutter max $T_2$ is determined by the maximum value $D_{value}$ (step S23).

That is, the exposure state is determined using the reference maximum value. When the reference maximum value is less than a reference value for a determination of overexposure, the exposure is determined as overexposure. When the reference minimum value is more than a reference value for a determination of underexposure the exposure is regarded as underexposure.

The determination as to the exposure state of the film image is not limited to the determination of underexposure, standard exposure, overexposure. The exposure state may be determined in more detail. The determination of the exposure state is not limited to the case when the reference maximum value is used. The reference minimum value and the average value of all gradation data may be used. Furthermore, two or three of the reference maximum value, the reference minimum value, and the average value may be optionally used when the exposure state is determined.

Figure 4:
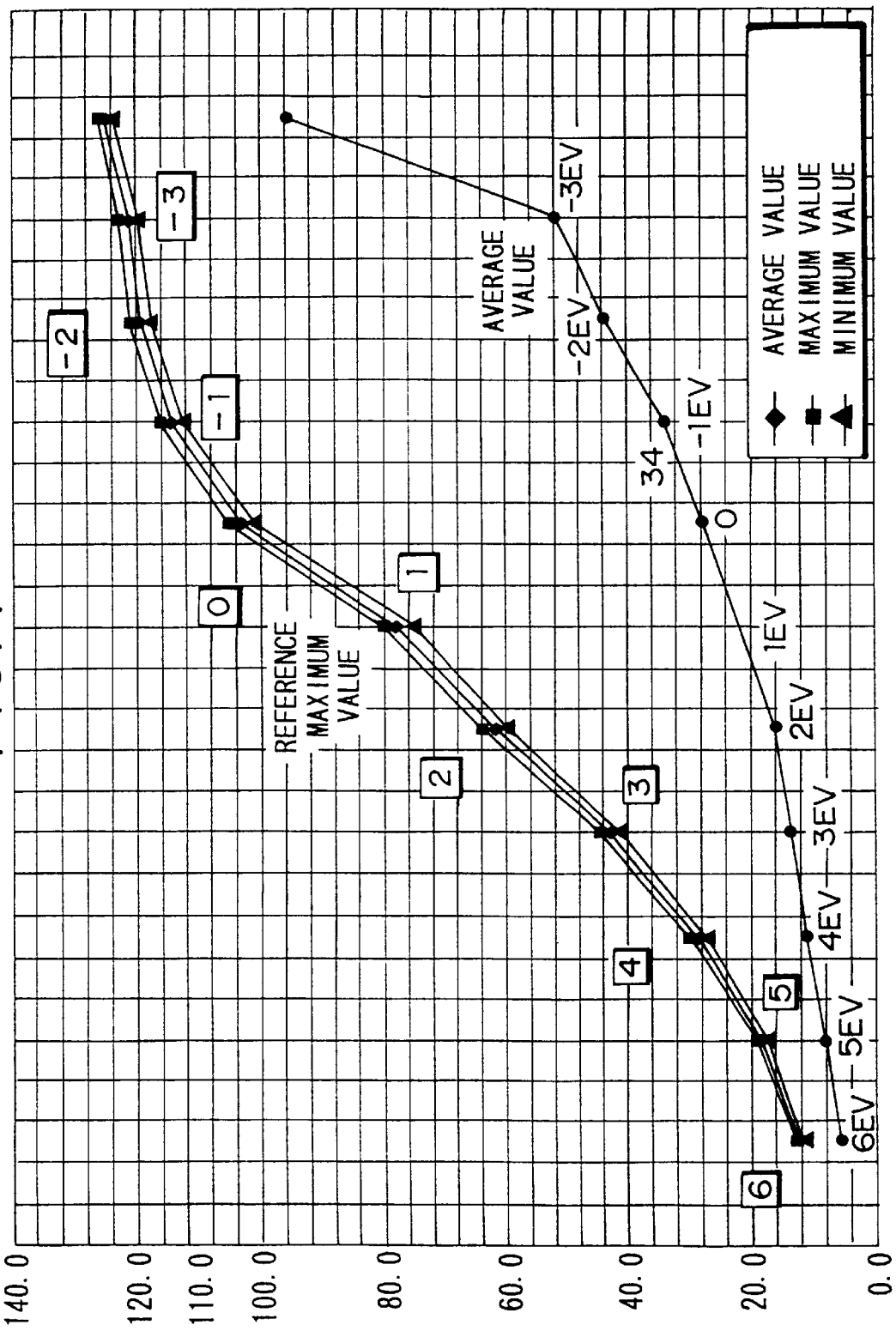
FIG. 4 is a graph showing a reference maximum value and an average value according to an exposure state of a film image.

FIG. 4 is a line graph showing the reference maximum value and the average value according to the exposure state of the film image.

The reference maximum value and the average value in FIG. 4 are values which are normalized by the average value of the image signals, which are gained when the negative base is picked up, after the calibration in step S10 as shown in the following equation.

$$\text{Normalized Reference Maximum Value} = \frac{\text{Reference Maximum Value}}{\text{Average Value of Negative Base}} \times 128 \quad (1)$$

$$\text{Normalized Average Value} = \frac{\text{Average Value of FIlm Image}}{\text{Average Value of Negative Base}} \times 128 \quad (2)$$

Incidentally, because the normalized values are used, the reference maximum value and the average value are not influenced by slight variations (variations in the determination of an analog gain) in the maximum value in the calibration.

Three line graphs of the reference maximum value in FIG. 4 are a line graph, which is made from an average value (♦ in FIG. 4) of 30 reference maximum values obtained by picking up the standardly-exposed film image, the film image of underexposure from −3 EV to −1 EV, the negative base, and the film image of overexposure from 1 EV to 6 EV thirty times; a line graph which is made from a maximum value (■ in FIG. 4) of 30 reference maximum values, and a line graph from a reference minimum value (Δ in FIG. 4) of 30 reference maximum values, respectively. Likewise, the line graph of the average value in FIG. 4 is a line graph which is made from an average value of the film image, which is obtained by one image pickup.

As shown in FIG. 4, regarding the film image of under exposure from −3 EV to 1 EV, the change in the reference maximum value according to the change in the exposure state is small (that is, the incline of the line graph is gentle). Therefore, it is impossible to accurately determine the exposure state of the film image based on the reference maximum value which is normalized by the equation (1). For example, the maximum value (■ in FIG. 4) of 30 reference maximum values of the −2 EV film image is larger than the minimum value (Δ in FIG. 4) of 30 reference maximum values of the −3 EV film image. The relationship between the reference maximum value and the exposure state of the film image can be sometimes reversed.

In view of the above-described circumstances, the average value of the film images is used in addition to the reference maximum value, so that the exposure state of the underexposed film image can be determined based on the average value.

That is, the normalized reference maximum value is more than a predetermined value (a value which secures the accuracy in the determination of the exposure state of the film image based on the reference maximum values 110 in the embodiment as shown in FIG. 4.), the exposure state of the film image is determined based on the average value which is normalized by the equation (2), not the normalized reference maximum value.

In the case of the underexposed film image, the incline of the normalized average value is steeper than the normalized reference maximum value as shown in FIG. 4. Therefore, if the film image is underexposed, the exposure state of the film image can be accurately determined based on the normalized average value.

In the case of a film image, which is. obtained by flashing the subject at night, the reference maximum value of the film image is a value depending on the background which the flash does not reach. The brightness of the subject illuminated by the flash is taken into account in the case of the average value. Therefore, if the exposure state of the film image by means of the normalized average value, there is an advantage in that the determination of the exposure state can be centered on the subject (main subject).

Incidentally, in this embodiment, the reference maximum value and the average value are switched for use; however, the present invention is not limited to this. A value, wherein the accuracy in the determination of the exposure state of the film image is improved according to the exposure state of the film image, may be selected appropriately among the reference maximum value, the reference minimum value, and the average value. Then, the exposure state of the film image may be determined based on the selected value.

Moreover, it is possible to use a value (see the line graph indicated by ♦ in FIG. 4) which is an average of a plurality of reference maximum values, which are obtained by picking up one film image a plurality of times, as the information obtained from the film image for the determination of the film image. In this case, the reference maximum value can be determined accurately even in the case of the underexposed film image, so the exposure state can be determined correctly. Incidentally, the exposure state of the film image may be determined using the averaged reference minimum value, the averaged average value of the film image, and the like.

On the other hand, the tone such as soft tone, hard tone, etc. is determined by the ratio of the reference maximum value and the reference minimum value (hereinafter referred to as a brightness ratio). That is, $G_{max}/G_{min}$, the brightness ratio of G is compared with a predetermined threshold level $Th_1$, which indicates the hard tone, and the threshold level $Th_2$, which indicates a soft tone. Then, when the ratio $G_{max}/G_{min}$ is less than the threshold level $Th_1$, the tone is determined as the hard tone, and when the ratio $G_{max}/G_{min}$ is more than the threshold level $Th_2$, the tone is determined as the soft tone. In this case, the threshold levels $Th_1$ and $Th_2$ are set for a negative image, which is determined to be standard exposure. The tone is determined based on threshold levels $Th_3$ and $Th_4$, which are set to be lower than the threshold levels $Th_1$ and $Th_2$, for the negative image, which is determined to be overexposure or underexposure.

Moreover, the electronic shutter value $T_2$ is determined using the maximum value $D_{MAX}$ obtained from the simplified histogram. The electronic shutter value $T_2$ is determined so that the maximum value in the later-described fine scanning can be a predetermined value (255 for example in 8 bit system). That is, the electronic shutter value $T_2$ is determined by the following equation:

$$T_2 = 255 \times T_1 / D_{max} \quad (1)$$

In this case, $T_1$ is the electronic shutter value in pre-scanning.

Next, the reference maximum values $R_{MAX}$, $G_{MAX}$, and $B_{MAX}$ and the reference minimum values $R_{MIN}$, $G_{MIN}$, and $B_{MIN}$, are corrected based on the exposure state, the results of the determination as to the tone, and the electronic shutter value $T_2$ (step S24)

First, when the tone is determined to be a hard tone or soft tone, at least one of the reference maximum value $G_{MAX}$ is corrected. As a result, the brightness ratio $G_{max}/G_{min}$ is in a range between the threshold levels $Th_1$ and $Th_2$ in the case of the standardly-exposed negative image. The brightness ratio $G_{max}/G_{min}$ is in a range between the threshold levels $Th_3$ and $Th_4$ in the case of the overexposed or underexposed negative image. The reference maximum values $R_{max}$ and $B_{max}$ are also corrected in accordance with the correction of the reference maximum value $G_{max}$ and the reference minimum value $G_{min}$. When the brightness ratio is in the range of the threshold levels, the reference maximum value and the reference minimum value are not corrected. In this embodiment, the tone such as hard tone, soft tone, etc., is determined based on the ratio between the reference maximum value and the reference minimum value; however, the present invention is not limited to this. The tone may be determined based on the difference between the reference maximum value and the reference minimum value.

Because the exposure in the fine scanning is $T_2/T_1$ of the exposure in the pre-scanning, the reference maximum value and the reference minimum value are corrected by the differential amount in the electronic shutter value between the pre-scanning and the fine scanning.

An offset and a white balance gain (WB gain) for adjusting the white balance and the black balance are determined based on the reference maximum value and the reference minimum value, which are finally determined in the above-mentioned manner (step S25).

That is, the CPU 40 calculates the offset for each of R, G and B based on the finally-determined reference maximum value by the following equation:

$$\text{Offset}=255-G_{MAX} \quad (4)$$

The CPU also calculates the gain for each of R, G and B based on the reference maximum value and the reference minimum value by the following equation:

$$WB \text{ gain}=255/(G_{max}-G_{min}) \quad (5)$$

Incidentally, the above-mentioned equations (4) and (5) relates to G. Other color channels are calculated in the same way.

In step S25, the gamma gain for R, G and B is determined based on the exposure state of the negative image. This will be explained later in detail.

Next, the fine scanning of the image is executed based on the electronic shutter value $T_2$, the offset, the WB gain and the gamma gain (step S30).

That is, in the fine scanning, the electronic shutter value of the CCD line sensor 14 is set at $T_2$, and the film 52 is transported at a constant speed, so that the film image is scanned (fine scanning). During the fine scanning, the dot-sequential R, G and B digital image signals are output to the digital signal processing circuit 20 by the CCD line sensor 14, the analog amplifier 16 and the A/D converter 18.

Next, an explanation will be given of signal processing in the digital signal processing circuit 20.

In the fine scanning, the offset value of G is added to an original $G_{org}$ from the A/D converter 18 as shown in the following equation:

$$G1=G_{org}+\text{offset} \quad (6)$$

Figure 5A:
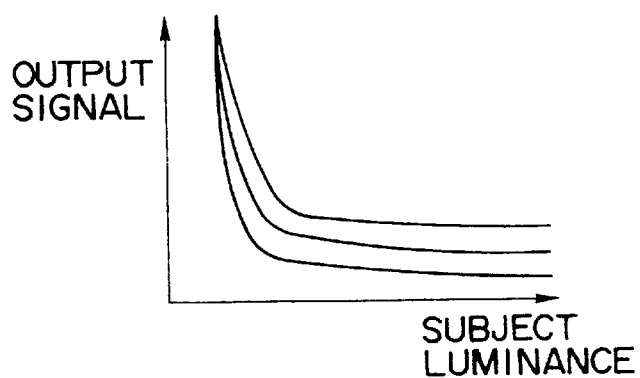
FIGS. 5(A), 5(B), 5(C) and 5(D) are graphs showing the process in each part of a digital signal processing circuit of FIG. 1.

As a result, the black-offset digital image signal G1 can be obtained. The same process is executed for the original R and B, so that the peak value of the R, G and B digital image signals (black in the positive image) can correspond to each other (see FIG. 5(A)).

Figure 5B:
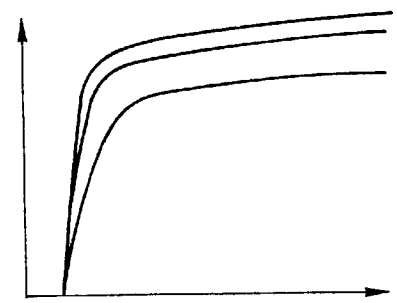

Next, the following operation is performed with regard to the digital image signal G1 which was offset in the above-mentioned step, so that the negative-positive inversion is carried out (see FIG. 5(B)):

$$G2=255-G1 \quad (7)$$

Figure 5C:
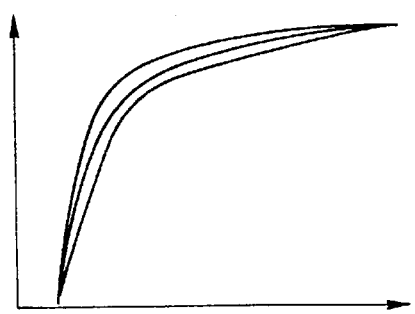

Next, the WB gain, which is determined by the equation (5), is multiplied by the digital image signal G2, which was negative-positive inverted, as shown in the following equation so that the other peak values (white in the positive image) of the R, G and B digital image signals correspond to each other (see FIG. 5(C)):

$$G3=G2\times WB \text{ gain} \quad (8)$$

Figure 5D:
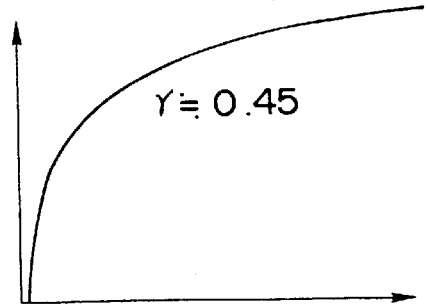

Finally, the different gamma correction is performed for each of the R, G and B digital image signals, which were multiplied by the WB gain, so that the grey can be adjusted (see FIG. 5(D)).

Next, a detailed explanation will hereunder be given of the gamma correction.

First, a lookup table (hereinafter referred to as a base LUT), which is a reference in gamma correction, is prepared.

Figure 6A:
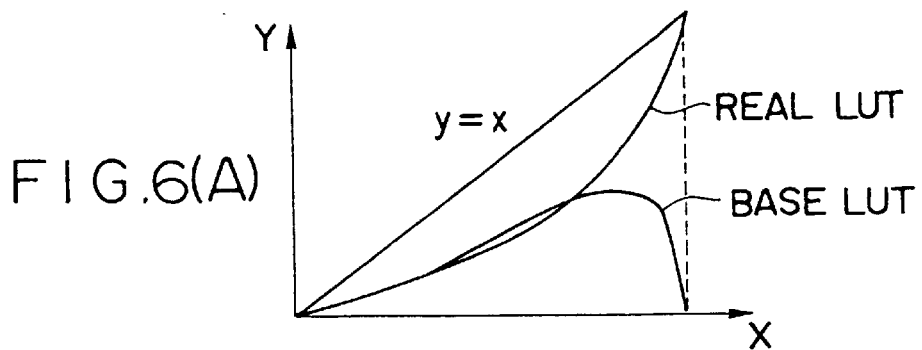
FIGS. 6(A), 6(B), and 6(C) are graphs showing how to correct the gamma.

The base LUT stores a gamma correction value indicating the difference between the curve of the negative film's gamma and the curve of the gamma (generally, $\gamma=0.45$) of the video signal transmitted to the Brawn tube for each gradation. Incidentally, the real lookup table, which indicates the input/output characteristics, (hereinafter referred to as a real LUT) is obtained by subtracting the base LUT (gamma correction value) from a function $y=x$ as shown in FIG. 6(A).

Figure 6B:
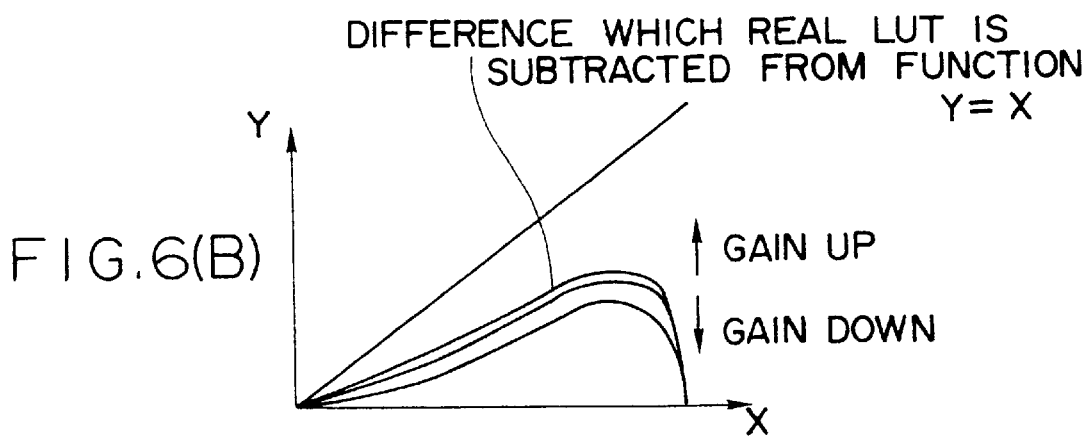
Figure 6C:
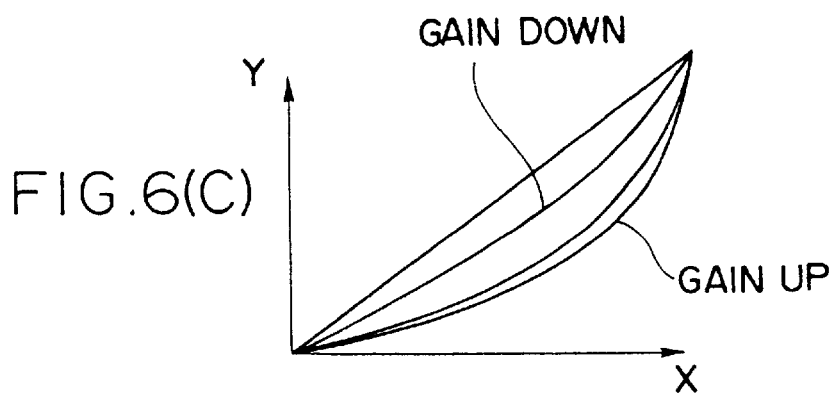

The base LUT is multiplied by the gamma gain, so that the base LUT can be changed (see FIG. 6(B)). One base LUT is multiplied by appropriate gamma gain so that the LUT, wherein the gamma correction value is extended or condensed for P, G and B, can be obtained. Incidentally, FIG. 6(C) is the real LUT of R, G and B, which is obtained by subtracting the LUT, wherein the gamma correction value is extended or condensed for R, G and B, from the function $y=x$.

Thus, if the white balance and the black balance are adjusted by the above-mentioned equations (6), (7) and (8), and the gamma correction is performed for the dot-sequential R, G and B digital image signals, which were negative-positive inverted, the gamma correction value is sequentially read out from the base LUT based on the dot-sequential R, G and B digital signals. Then, the gamma correction is multiplied by the gamma gain of R, G and B, so that the appropriately-extended or contracted gamma correction value can be obtained. The extended or condensed gamma correction value for each color is subtracted from the dot-sequential gamma correction value, so that the gamma correction can be performed dot-sequentially for each color.

Figure 7:
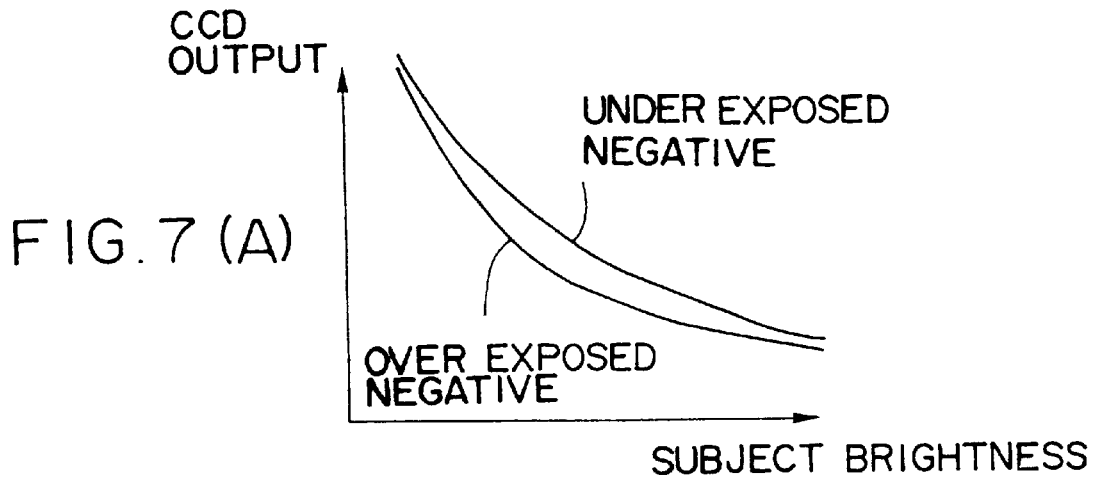
FIGS. 7(A), 7(B) and 7(C) are graphs showing the gradation characteristics, the gamma characteristics and the base LUT of differently-exposed negatives.
Figure 7:
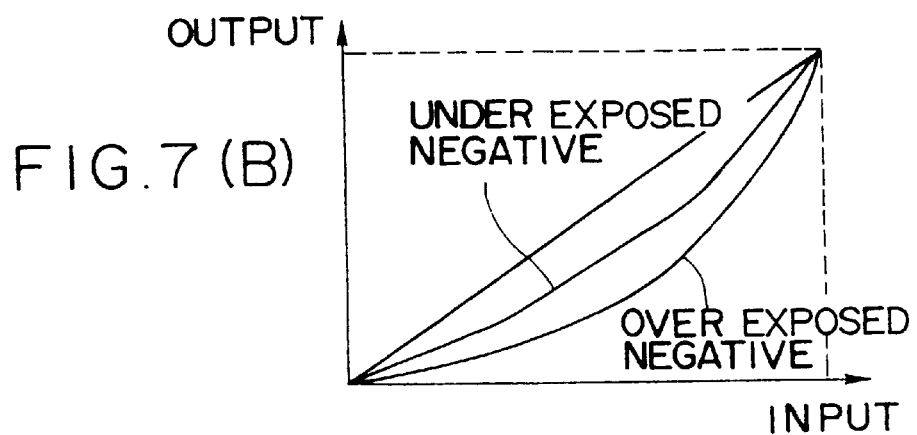
Figure 7:
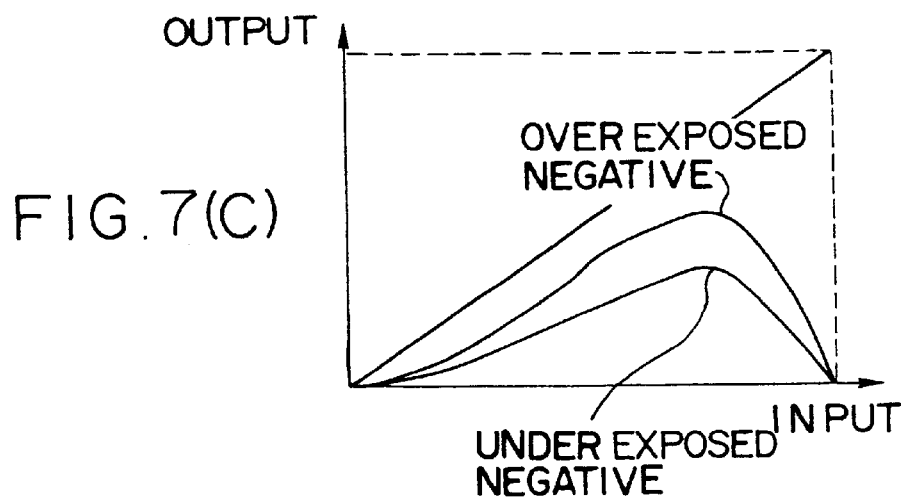

The gamma gain of each of R, G and B is set previously depending on the gradation characteristics of the standardly-exposed negative film. As shown in FIG. 7(A), the gradation characteristics are different according to the exposure state of the negative film in photographing. As shown in FIG. 7(B), the gamma characteristics is also different. Therefore, as shown in FIG. 7(C), the base LUT needs to be changed depending on the negative exposure.

Accordingly, the result of the determination as to the exposure state of the negative image is used to change the gamma gain of each color ($R_{gamgain}$, $G_{gamgain}$, and $B_{gamgain}$) depending on the exposure state, so that the gamma correction can be performed depending on the exposure state of the negative image. That is, if the negative image is determined to be in a state of underexposure, the gamma gain is smaller than the gamma gain of standard exposure. On the other hand, if the negative image is determined to be in a state of underexposure, the gamma gain is large so that the tone can be adjusted.

Figure 8:
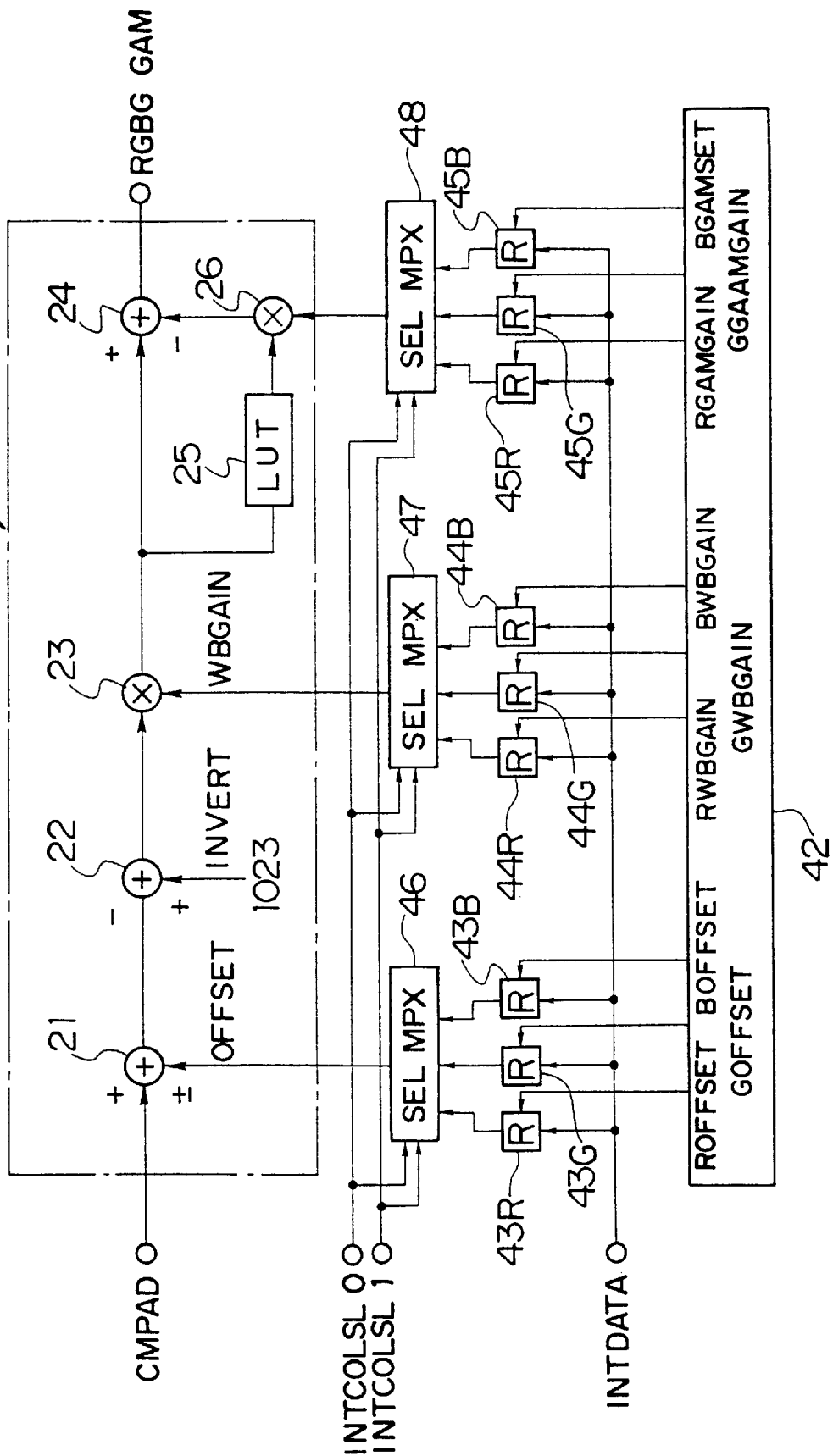
FIG. 8 is a block diagram showing the detailed structure of the digital signal processing circuit of FIG. 1.

FIG. 8 is a block diagram including the structure of the digital signal processing circuit 20 of FIG. 1. The digital signal processing circuit 20 executed the above-mentioned digital signal process. It mainly comprises an adders 21, 22, and 24, multipliers 23 and 26, and the base LUT 25. The dot-sequential R, G and B digital image signal CMPAD are transmitted from the A/D converter to the adder 21.

Incidentally, the dot-sequential R, G and B digital image signal CMPAD flows in time series according to a predetermined clock.

On the other hand, the CPU 40 calculates and stores the offset ($R_{offset}$, $G_{offset}$, $B_{offset}$) and the WB gain ($R_{wbgain}$, $G_{wbgain}$, $B_{wbgain}$) for each of R, G and B as shown in the equations (2) and (3). The CPU 40 also stores the gamma gain ($R_{gamgain}$, $G_{gamgain}$, $B_{gamgain}$) for each of R, G and B. The offset, etc. are stored in each frame. Then, the offset, etc. corresponding to a frame to be scanned by an address decoder 42 are selected. The offset for R, C and B is stored in registers 43R, 43G and 43B; and the gamma gain for R, G and B is stored in registers 45R, 45G and 45B by INTDATA in FIG. 8. Incidentally, the R, G and B digital image signals of one frame are held in these registers until they are processed.

The offset ($R_{offset}$, $G_{offset}$, $B_{offset}$) in the registers 43R, 43G and 43B is applied to a multiplexer 46. A timing signal INTCOL SL 0, 1, which is generated by dividing the predetermined clock, is applied to the other input of the multiplexer 46. The multiplexer 46 selects one of the three offset by the timing signal INTCOL SL 0, 1, and outputs the selected offset to the other input part of the adder 21 in the digital signal processing circuit 20.

Likewise, the multiplexer 47 selects one of three WG gain ($R_{gamgain}$, $G_{gamgain}$, $B_{gamgain}$) from the registers 44R, 44G and 44B, and outputs the selected WB gain to the multiplier 23. The multiplexer 48 selects one of the gamma gain ($R_{gamgain}$, $G_{gamgain}$, $B_{gamgain}$) from the registers 45R, 45G and 45B, and outputs the selected gamma gain to the multiplier 26.

On the other hand, the digital image signal CMPAD enters the adder 21 as mentioned above, and the adder 21 adds the digital image signal CMPAD to the offset. As a result, the black-offset digital image signal can be obtained (see the equation (6) and FIG. 5(A)).

The black-offset image signal from the adder 21 is applied to a negative input of the adder 22. A value (255) indicating a white peak level is applied to a positive input of the adder 22. The adder 22 subtracts the black-offset digital image signal from 255. As a result, the negative-positive inverted digital image signal can be obtained (see the equation (7) and FIG. 5(B)).

Next, the negative-positive inverted digital image signal is added to the multiplier 23. The WB gain is applied to the other input part of the multiplier 23 by the multiplexer 47. The multiplier 23 multiplies two inputs so as to adjust the white of the positive images of the R, G nd B digital image signals (see the equation (8) and FIG. 5(C)).

Next, the digital image signal from the multiplier 23 is applied to the adder 24 and the base LUT 25. The base LUT 25 has a gamma correction value depending on the gradation of the input signal as shown in FIG. 6(A). The base LUT 25 reads the gamma correction value depending on the gradation of the input digital image signal, and outputs the gamma correction value to the multiplier 26. The gamma gain is applied to the other input of the multiplier 26 by the multiplexer 48. The multiplier 23 multiplies two inputs so as to generate the gamma correction values for each color of the R, G and B digital image signals. The gamma correction values are output to a negative input of the adder 24.

The adder 24 subtracts the gamma correction value, which was extended or contracted for each color, from the R, G and B digital image signals. As a result, the gamma-corrected regular R, G and B digital image signal $RGBG_{gam}$ can be obtained.

Incidentally, the gamma correction method is not limited to the method using the base LUT as shown in this embodiment. If the gamma is changeable, any gamma correction method can be employed.

Figure 9:
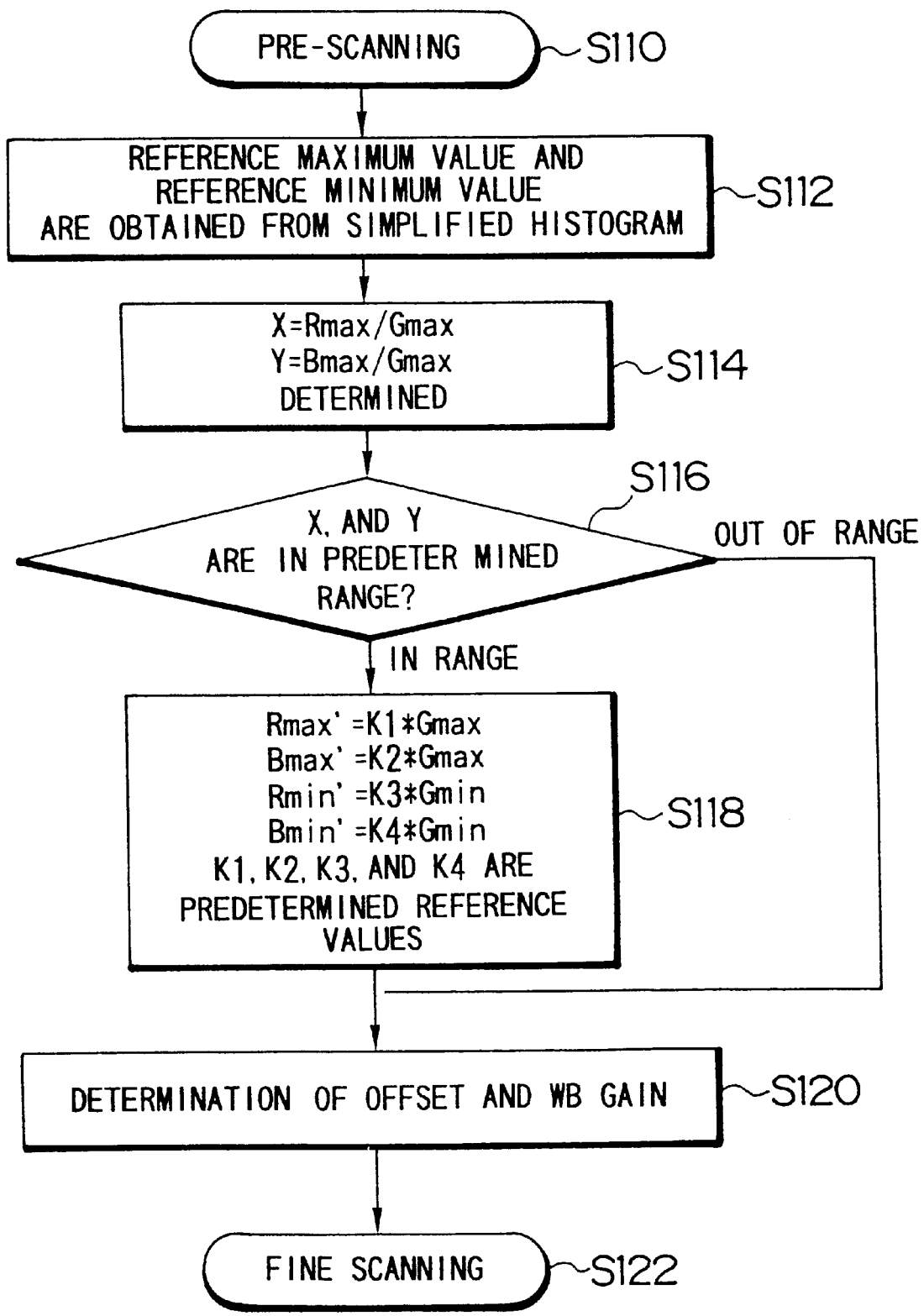
FIG. 9 is a flow chart showing other processing on the image in the film scanner of FIG. 1.

Next, an explanation will be given of the image processing method for making it possible to reproduce the color satisfactorily with reference to the flow chart in FIG. 9.

First, the pre-scanning is executed (step S110), and the simplified histogram (see FIG. 3) is made so as to determine the reference minimum values $R_{min}$, $G_{min}$, $B_{min}$ and the reference maximum values $R_{max}$, $G_{max}$, $B_{max}$ are obtained (step S112). Incidentally, because the process during these steps is as shown in the flow chart of FIG. 2, a detailed explanation is omitted here.

Next, the ratios X and Y of the reference maximum values are obtained from the reference maximum values $R_{max}$, $G_{max}$, $B_{max}$ by the following equation (step S114):

$$X = R_{max}/G_{max}$$

$$Y = B_{max}/G_{max}$$

Then, it is determined based on the ratios X and Y whether or not the unevenness of the reference maximum values is in a range where a predetermined white balance adjustment is possible (step S116).

Figure 10:
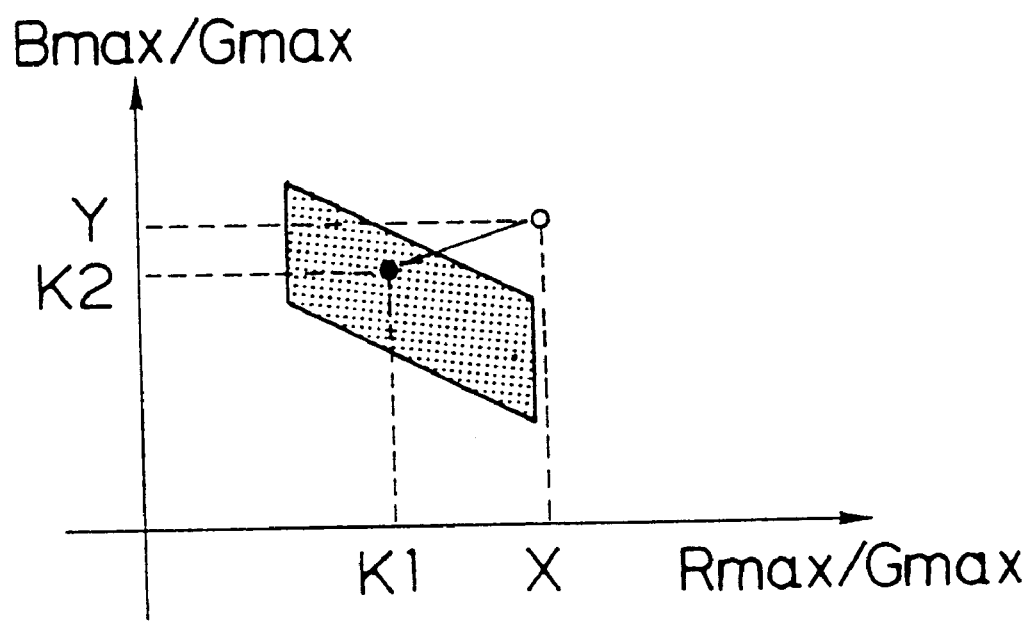
Figure 11:
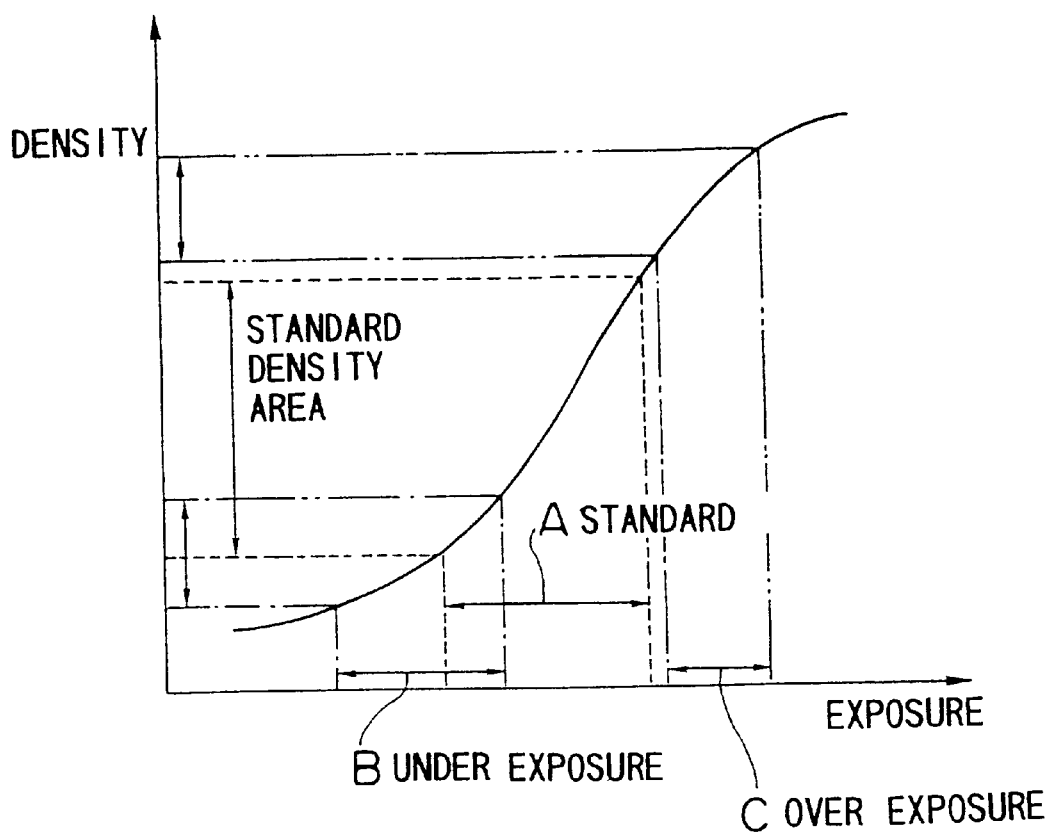
FIG. 11 a graph showing the characteristics curve of the negative film.
Figure 12:
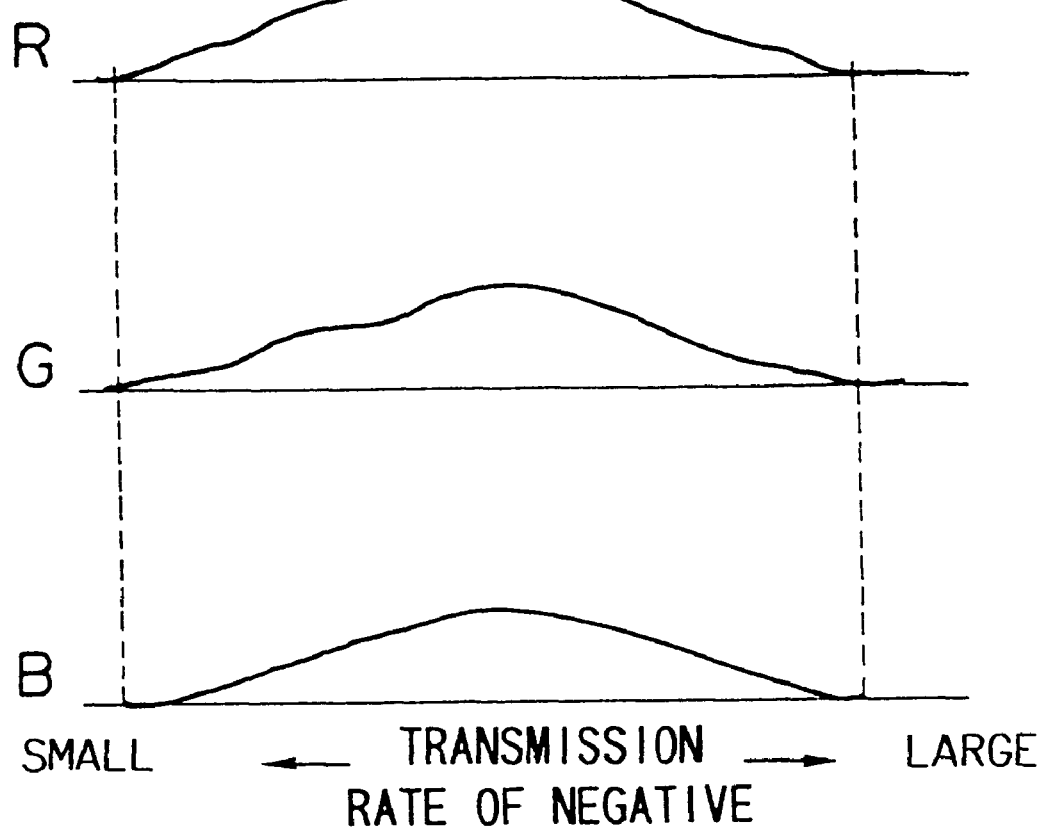
FIG. 12 is a histogram of R, G and B in the case when the reference minimum value of B is much larger than the reference minimum value of the other signals.

That is, a color failure detection frame is set as shown in FIG. 10. If the coordinates in FIG. 10, which is determined by the ratios X and Y, is out of the color failure detection frame, the scene is determined to be the color failure scene. Then, the reference maximum values $R_{max}$, $B_{max}$, of R and B are corrected to be close to the reference maximum value $G_{max}$, and the reference minimum values $R_{min}$, $B_{min}$ of R and B are corrected to be close to the reference minimum value $G_{min}$ (step S118).

In the step S118, if the references with respect to X and Y are $X_{ref}$=K1 and $Y_{ref}$=K2, respectively, the reference maximum values $R_{max}$ and $B_{max}$ of R and B are corrected to $R_{max}'$ and $B_{max}'$ as shown in the following equation:

$$R_{max}' = K1 \times G_{max}$$

$$B_{max}' = K2 \times G_{max}$$

The reference minimum values $B_{min}$ and $R_{min}$ are corrected in the same manner. That is, the reference minimum values $R_{min}$ and $B_{min}$ of R and B are corrected to $R_{min}'$ and $R_{min}'$ by the previously-set reference ratios K3 and K4, and the reference minimum value $G_{min}$ as shown in the following equation:

$$R_{min}' = K3 \times G_{min}$$

$$R_{min}' = K4 \times G_{min}$$

Next, if the scene is determined to be the color failure scene, the corrected reference minimum value and the reference maximum value are used. If the scene is not determined to be the color failure scene, the reference minimum value and the reference maximum value obtained in the step S112 are used so that the offset and the white balance gain (WB gain) are determined to be used for adjusting the white balance and the black balance by the above-mentioned equations (4) and (5) (step S120).

Next, the fine scanning of the negative image is performed based on the offset and the WB gain which are determined in the above-mentioned step (step S122).

That is, in the process of fine scanning, the film 52 is transported at a constant speed, so that the film image is scanned (fine scanning) (step S122). During the fine scanning, the dot-sequential R, G and B digital image signals are output to the digital signal processing circuit 20 via the CCD line sensor 14, the analog amplifier 16, and the A/D converter 18.

Incidentally, in this embodiment, it is determined based on the ratio of the reference maximum values whether the reference maximum value and the reference minimum value are corrected or not. However, the present invention is not limited to this. It may be determined based on the difference between the reference maximum values of difference colors whether the reference maximum value and the reference minimum value are corrected or not. The determination may also be performed using the reference minimum value instead of the reference maximum value. In this embodiment, both the reference maximum value and the reference minimum value are corrected; however, it is acceptable if one of them is corrected. Furthermore, the reference maximum value and the reference minimum value of R and B are corrected to be close to those of G; however, the present invention is not limited to this. Any method is acceptable if the reference maximum values and/or the reference minimum values of each color are corrected to nearly correspond to each other.

As has been described above, according to the present invention, when the image is processed based on the reference maximum value and the reference minimum value of the image signal gained by the image pickup of the film image, the image is processed in accordance with the exposure state of the film image, so that the tone can be reproduced satisfactorily. In particular, if the reference maximum value or the reference minimum value is used to determine the exposure state of the film image, circuits required for determining the exposure state and the load of the soft can be minimized, and the exposure state can be determined easily. Moreover, the exposure state of the film image is determined based on an average value of plural reference maximum values obtained by picking up the image plural times. Alternatively, a value, wherein the accuracy in the determination of the exposure state of the film image is high, is selected appropriately from the reference maximum value the reference minimum value and the average value of the film image in accordance with the exposure state of the film image, and the exposure state is determined based on the selected value. As a result, the exposure state can be determined accurately even in a case of the underexposed or overexposed film image. Furthermore, the reference maximum value, etc. are normalized based on the average value of the image signal, which is gained when the non-exposure area of the film is picked up. Therefore, the exposure state of the film image can be determined regardless of the film base's density, the amplifier gain, and the like.

According to the present invention, if the exposure state of the film image is underexposed, the gamma in the gamma correction is made small. If the exposure state of the film image is overexposed, the gamma is made large. As a result, the brightness in the middle tone can be correct in a state of the underexposure and the overexposure. Moreover, at least one of the reference maximum value and the reference minimum value is corrected so that the ratio or the difference between the reference maximum value and the reference minimum value is in a predetermined range from the first threshold level to the second threshold level. As a result, the tone of the soft tone image and the hard tone image is changed. Furthermore, if the exposure state of the film image is underexposed or overexposed, the first and second threshold levels are changed to the third and fourth threshold levels, which are lower than the first and second threshold levels, so that the tone of the film image does not change unnaturally, and the tone can be reproduced satisfactorily.

Furthermore, according to the present invention, even in the color failure scene wherein there is an extremely high brightness area and the reference maximum values and the reference minimum values of each color are greatly uneven; the unevenness of the reference maximum values and/or the reference minimum values of each color is corrected. Therefore, the white balance can be adjusted as desired, and the color can be reproduced satisfactorily.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. An image processing method comprising:

picking up a film image taken in developed photographic film;

obtaining a reference maximum value, a reference minimum value and an average value from an image signal representing the film image;

selecting an accuracy threshold value suitable for determining an exposure state of the film image based on the reference maximum value, the reference minimum value and the average value;

determining the exposure state of the film image based on at least one of the reference maximum value, the reference minimum value and the average value according to a relationship between the selected accuracy threshold value and at least one of the reference maximum value, the reference minimum value and the average value; and processing the film image based on the reference maximum value the reference minimum value and the exposure state.

2. The image processing method of claim 1, wherein a plurality of reference maximum values, a plurality of reference minimum values, or a plurality of average values obtained by plural pickups of one film image are averaged to produce the reference maximum value, the reference minimum value, or the average value for determining the exposure state of the film image.

3. The image processing method of claim 1, further comprising:

obtaining all gradation data of one frame from the image signal gained by the image pickup;

counting all gradation data of one frame every gradation to form a histogram;

obtaining the reference maximum value based on a point where an accumulated frequency, which is counted from larger gradation of the histogram, exceeds a predetermined ratio with regard to total points of the gradation data; and obtaining the reference minimum value based on a point where an accumulated frequency, which is counted from smaller gradation of the histogram, exceeds a predetermined ratio with regard to the total points of the gradation data.

4. The image processing method of claim 3, wherein the gradation data is average gradation data in an area divided in plural pixels.

5. The image processing method of claim 1, comprising:

picking up a non-exposure area in the developed photographic film in a predetermined exposure state before picking up the film image;

correcting a predetermined exposure state so that the image signal obtained when the non-exposure area is picked up reaches a predetermined signal level; and picking up the film image in the corrected exposure state.

6. The image processing method of claim 1, wherein the reference maximum value, the reference minimum value, or the average value for determining the exposure state of the film image is a value normalized based on the average value of the image signal obtained by the image pickup in a non-exposure area.

7. The image processing method of claim 1, further comprising performing a gamma correction by decreasing a gamma compared to a standard exposure when the exposure state is underexposure, and by increasing the gamma compared to the standard exposure when the exposure state is overexposure.

8. An image processing method obtaining a reference maximum value and a reference minimum value from an image signal obtained when a film image is picked up, correcting at least one of the reference maximum value and the reference minimum value so that a difference or a ratio between the reference maximum value and the reference minimum value is in a range from a first threshold level to a second threshold level, which are set previously to obtain a predetermined tone, and correcting the image signal so that the corrected reference maximum value and the reference minimum value are a predetermined gradation, comprising:

determining an exposure state of the film image; and if the exposure state of the film image is underexposed or overexposed, changing the first threshold level and the second threshold level to a third threshold level and a fourth threshold level which are less than the first threshold level and the second threshold level, respectively.

9. The image processing method of claim 8, wherein the exposure state of the film image is determined based on at least one of the reference maximum value and the reference minimum value.

10. An image processing method, comprising:

(a) obtaining a reference maximum value and a reference minimum value from image signals of different colors, which are obtained when a color image is picked up;

(b) obtaining at least one of a ratio or difference between the reference maximum values of different colors and a ratio or difference between the reference minimum values of different colors;

(c) determining a corrected reference maximum value of at least one color which is close to the reference maximum value of a different color and/or a corrected reference minimum value of at least one color which is close to the reference minimum value of a different color if the ratio or difference is out of a range;

(d) correcting at least one image signal so that the reference maximum value and/or the reference minimum value without correction in said step (c) are a predetermined gradation if the ratio or difference is in the range; and (e) correcting at least one image signal so that the corrected reference maximum value and/or the corrected reference minimum value are a predetermined gradation if the ratio or difference is out of the range.

11. The image processing method of claim 10, wherein the image signals of different colors are R, G and B image signals, and when the ratio or difference is out of the range, the reference maximum value and/or reference minimum value of the R and B image signals are corrected so as to be close to the reference maximum value and/or reference minimum value of the G image signal.

12. An image processing method comprising:

picking up a film image taken in developed photographic film;

obtaining a reference maximum value, a reference minimum value and an average value of an image signal representing the film image;

determining an exposure state of the film image based on the reference maximum value if the reference maximum value is a first predetermined value or less, the first predetermined value being suitable for determining the exposure state of the film image;

determining the exposure state of the film image based on the average value if the reference maximum value is a second predetermined value or more, the second predetermined value being suitable for determining the exposure state of the film image; and processing the film image based on the reference maximum value, the reference minimum value and the determined exposure state.

* * * * *